(12) United States Patent
Sharma

(10) Patent No.: US 11,632,691 B1
(45) Date of Patent: *Apr. 18, 2023

(54) DYNAMIC PDCP DUPLICATION WITH BEARER MODIFICATION, TO HELP OVERCOME REDUCED WIRELESS QUALITY

(71) Applicant: Sprint Spectrum L.P., Overland Park, KS (US)

(72) Inventor: Ankur Sharma, Plano, TX (US)

(73) Assignee: Sprint Spectrum LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/448,430

(22) Filed: Sep. 22, 2021

Related U.S. Application Data (63) Continuation of application No. 16/822,575, filed on Mar. 18, 2020, now Pat. No. 11,140,574.

(51) Int. Cl.
- *H04W 28/02* (2009.01)
- *H04L 5/00* (2006.01)
- *H04W 80/08* (2009.01)

(52) U.S. Cl.
CPC ....... *H04W 28/0268* (2013.01); *H04L 5/0082* (2013.01); *H04W 28/0257* (2013.01); *H04W 80/08* (2013.01)

(58) Field of Classification Search
None
See application file for complete search history.

(56) References Cited

U.S. PATENT DOCUMENTS

| | | | |
|---|---|---|---|
| 10,952,230 B1 * | 3/2021 | Pan | H04W 28/0268 |
| 11,140,574 B1 * | 10/2021 | Sharma | H04W 80/08 |

(Continued)

FOREIGN PATENT DOCUMENTS

| | | | |
|---|---|---|---|
| WO | WO-2016091298 A1 * | 6/2016 | |
| WO | WO 2019/170209 | 9/2019 | |

OTHER PUBLICATIONS

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 16)," 3GPP TS 23.401 v16.5.0 (Dec. 2019).

(Continued)

*Primary Examiner* — Anh Vu H Ly
(74) *Attorney, Agent, or Firm* — McDonnell Boehnen Hulbert & Berghoff LLP (57) ABSTRACT

A method and system to help facilitate communication between a user equipment device (UE) and an access node that is serving the UE, in a scenario where a bearer is configured for the UE, the bearer having a defined set of quality-of-service (QoS) requirements for communication of user-plane data on the bearer. When wireless coverage of the UE from the access node is threshold poor, the access node and a supporting core network could interwork to loosen the set of QoS requirements of the bearer in an effort to avoid loss of the bearer. And upon loosening of the set of QoS requirements, the access node could invoke Packet Data Convergence Protocol (PDCP) duplication for the communication between the UE and the access node on the bearer, to help improve quality of the communication between the UE and the access node in presence of the threshold poor wireless coverage.

19 Claims, 5 Drawing Sheets

(56) References Cited

U.S. PATENT DOCUMENTS

| | | | |
|---|---|---|---|
| 2014/0064071 A1* | 3/2014 | Paladugu | H04W 28/24 370/230 |
| 2014/0211619 A1* | 7/2014 | Suryavanshi | H04L 47/2425 370/230 |
| 2015/0131545 A1 | 5/2015 | Ameigeiras Gutierrez et al. | |
| 2018/0279168 A1 | 9/2018 | Jheng et al. | |
| 2018/0279169 A1 | 9/2018 | Wang et al. | |
| 2018/0324641 A1 | 11/2018 | Tsai et al. | |
| 2018/0332501 A1 | 11/2018 | Tseng et al. | |
| 2018/0367288 A1 | 12/2018 | Vrzic et al. | |
| 2019/0098640 A1 | 3/2019 | Holakouei et al. | |
| 2019/0239112 A1 | 8/2019 | Rao et al. | |
| 2019/0268798 A1* | 8/2019 | Jeong | H04W 28/06 |
| 2019/0394684 A1* | 12/2019 | Li | H04W 36/0022 |
| 2019/0394830 A1* | 12/2019 | Mildh | H04W 52/0222 |
| 2021/0084539 A1 | 3/2021 | Centonza et al. | |

OTHER PUBLICATIONS

3GPP, "3rd Generation Partnership Project; Technical Specification Group Services and System Aspects; System architecture for the 5G System (5GS); Stage 2 (Release 16)," 3GPP TS 23.501 V16.3.0 (Dec. 2019).

3GPP, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 16)," 3GPP TS 29.274 V16.2.0 (Dec. 2019).

\* cited by examiner

Fig. 5

DYNAMIC PDCP DUPLICATION WITH BEARER MODIFICATION, TO HELP OVERCOME REDUCED WIRELESS QUALITY

REFERENCE TO RELATED APPLICATION

This is a continuation of U.S. patent application Pub. Ser. No. 16/822,575, filed Mar. 18, 2020, the entirety of which is hereby incorporated by reference.

BACKGROUND

A cellular wireless network typically includes a number of access nodes that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each coverage area could operate on one or more radio-frequency (RF) carriers, each of which could be frequency division duplex (FDD), defining separate frequency channels for downlink and uplink communication, or time division duplex (TDD), with a single frequency channel multiplexed over time between downlink and uplink use.

Further, on the downlink and uplink, each carrier could be structured to define various physical channels having resources for carrying information between the access nodes and UEs. For example, the air interface could be divided over time into frames, each divided in turn into subframes and timeslots, and the carrier bandwidth (i.e., the frequency width of the carrier on the downlink and/or uplink) could be divided over frequency into subcarriers, which could be grouped within each subframe and timeslot to define physical resource blocks (PRBs) in which the subcarriers can be modulated to carry data.

In addition, certain resources on the downlink and/or uplink of each such carrier could be reserved for special purposes. For instance, on the downlink, certain resources could be reserved to define a synchronization signal that UEs could detect as an indication of the presence of coverage and a reference signal that UEs could measure in order to determine coverage strength, other resources could be reserved to carry downlink control-plane signaling from the access node to UEs, and other resources could be reserved to carry user-plane communications from the access node to UEs. And on the uplink, certain resources could be reserved to carry uplink control-plane signaling from UEs to the access node, and other resources could be reserved to carry user-plane communications from UEs to the access node.

Overview

In example operation, when a UE enters into coverage of such a network, the UE could initially scan for and detect threshold strong coverage of an access node on a carrier, and the UE could responsively engage in signaling with the access node to establish a Radio Resource Control (RRC) connection or the like between the UE and the access node. Further, the UE could engage in attach signaling via the access node with a core-network controller, to attach and thus register for service. And upon initial attachment and/or at other times when serving a UE, the network could coordinate setup for the UE of one or more user-plane bearers, each defining a logical tunnel for carrying packet-data communications between the UE and a core-network gateway system that provides connectivity with a transport network.

Each such bearer that is established for the UE could have a corresponding defined quality-of-service (QoS) service level, which could be indicated by one or more bearer attributes stored in context records for the UE at entities along the bearer path, such as at the UE, the access node, and the gateway system. For instance, each bearer could be associated with a particular QoS Class Identifier (QCI) and/or Differential Services Point Code (DSCP) value that defines various QoS attributes of the bearer, such as packet-delay budget, acceptable packet-loss rate, minimum or maximum bit rate, and the like. Entities along the bearer communication path could then work to handle communications on the bearer accordingly.

In practice, a bearer could be guaranteed-bit-rate (GBR) (e.g., QCIs 1-4) or non-GBR (e.g., QCIs 5-9). GBR bearers are typically used for real-time services such as voice, video, and real-time gaming, and would have a guaranteed minimum bit rate that entities along the bearer communication path could work to satisfy in order to facilitate the communication. Whereas, non-GBR bearers are typically used for non-real-time services, such as web browsing, file transfer, and email communication, having no guaranteed minimum bit rate.

Further, a bearer could be default (non-dedicated) or dedicated. A default bearer is typically established for a UE at the time of attachment and remains in place for as long as the UE is attached, to provide the UE with always-on packet-data-network connectivity. A default bearer is non-GBR and generally receives best-efforts service. Whereas, a dedicated bearer is typically established for a UE on an as-needed basis to carry a specific type of communication service such as one of the real-time services note above, typically in association with a given default bearer. As such, a dedicated bearer could be configured with a traffic flow template (TFT) to give special treatment to the specific type of service and could be GBR or non-GBR.

When a UE first attaches, the network may thus initially configure for the UE one or more default bearers. For instance, the network may initially configure for the UE of a default bearer with QCI 8 or 9 to carry general Internet communications such as those noted above. Further, to enable voice-over-Internet-Protocol (VoIP) service hosted by an Internet Multimedia System (IMS), the network may also initially configure for the UE a default bearer with QCI 5 to carry VoIP-call setup and management signaling (e.g., Session Initiation Protocol (SIP) signaling) between the UE and the IMS.

When appropriate during service of the UE, the network may then also configure for the UE a dedicated bearer associated with a particular default bearer. For instance, if and when the UE engages in VoIP-call-setup signaling over its default IMS-signaling bearer to set up an incoming or outgoing VoIP call, the network could responsively configure for the UE a dedicated VoIP bearer with QCI 1 for carrying packetized voice communications of the call. The UE could then engage in the VoIP call, transmitting and receiving packetized voice communications over that QCI-1 VoIP bearer and could engage in further VoIP-call-related signaling over its QCI-5 IMS-signaling bearer if and when necessary.

One technical problem that can occur while a UE is connected with an access node and is engaged in communication on a dedicated GBR bearer is that the UE's wireless connection with the access node may degrade to a point where the access node and/or UE can no longer satisfy the QoS requirements of that bearer. Unfortunately, when that happens, the network may then responsively release the bearer or otherwise drop the communication, which could create user-experience issues.

For example, when a UE is engaged in a VoIP call on a QCI-1 bearer and the UE's wireless coverage becomes very weak, downlink and/or uplink voice communications on the QCI-1 bearer may experience significant data errors, which could result in associated retransmission attempts and failures to meet packet-delay-budget, packet-loss, and minimum-bit-rate requirements of the bearer. When that happens, the network may then responsively release the UE's QCI-1 bearer, thus dropping the VoIP call.

The present disclosure provides an improved mechanism to help address this technical problem.

In accordance with the disclosure, when a UE is engaged in a communication on a dedicated GBR bearer and the UE's wireless coverage becomes threshold weak, the network will engage in a two-step process to help allow the communication to continue with a reasonably acceptable level of quality. First, at initiation of the UE or the access node, the network will engage in processing to loosen the set of QoS requirements of the bearer, such as by changing the bearer from being a dedicated GBR bearer to instead being a dedicated non-GBR bearer, thereby allowing the UE's poor wireless coverage to better support the QoS requirements of the bearer. And second, the access node will trigger application of PDCP duplication on the reduced-QoS bearer, in an effort to at least partially offset the poor quality resulting from the UE's weak coverage.

PDCP duplication involves having the packet data convergence protocol (PDCP) layer of a transmitting entity automatically output multiple copies a given PDCP protocol data unit (PDU) for transmission to a receiving entity in an effort to ensure that at least one copy of the PDU makes it successfully to the receiving entity, and having the PDCP layer of the receiving entity discard all but one successfully received instance of the PDCP PDU.

Use of PDCP duplication as presently contemplated differs from use of PDCP duplication merely for dual-connectivity communication or the like.

In a dual-connectivity environment where a UE is served by two access nodes over respective air-interface connections (such as over an LTE connection and a 5G NR connection), PDCP duplication could be applied in order to transmit the same PDCP PDU to the UE over both of the air-interface connections. For instance, the PDCP layer of a first access node could output a first instance of a PDCP PDU for transmission by the first access node over a first air-interface connection to the UE and could also output a second instance of the same PDCP PDU to the second access node for transmission by the second access node over a second air-interface connection to the UE. Transmitting the same PDCP PDU from both access nodes to the UE could help ensure that the UE successfully receives the PDCP PDU.

According to the present disclosure, however, PDCP duplication is applied with respect to communication between a single access node and a UE, over an air-interface connection that extends between that single access node and the UE (with or without dual connectivity), with the PDCP duplication being invoked in response to detecting that the UE has a wireless coverage problem on that air-interface. Especially for real-time services such as VoIP, video, or real-time gaming, use of PDCP duplication in that manner may help to improve communication quality by increasing the likelihood of successful transmission without requiring requests for PDCP retransmission. Further, doing so after first loosening the QoS requirements of the bearer at issue, such as converting the bearer from GBR to non-GBR, may facilitate this process by helping to avoid loss of the bearer in the first place.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

As noted above, FIG. 1 is a simplified block diagram of an example network arrangement in which aspects of the present disclosure can be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

Figure 1:
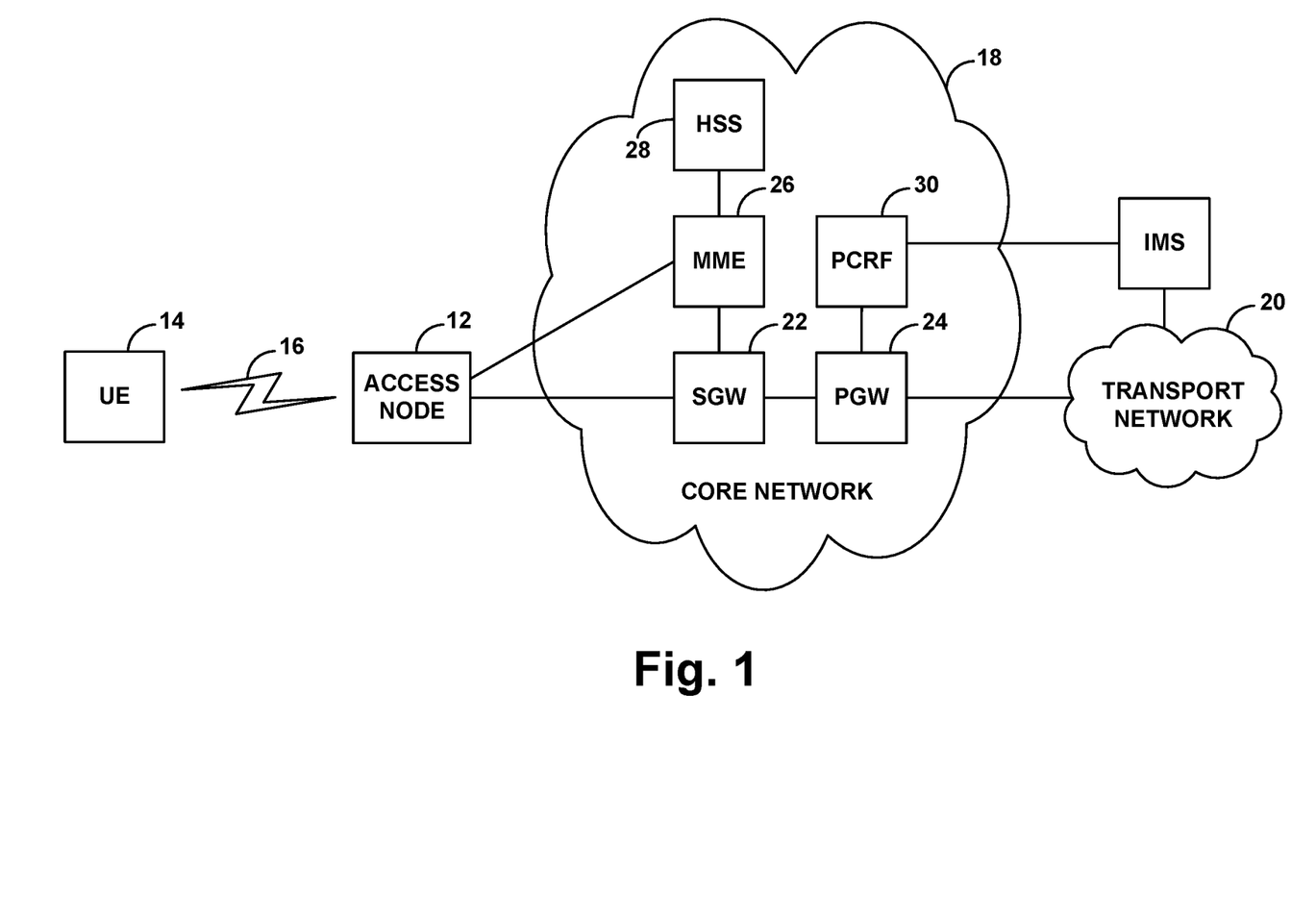
FIG. 1 is a simplified block diagram of an example wireless communication system in which features of the present disclosure can be implemented.

The arrangement of FIG. 1 includes by way of example a representative access node 12 and a representative UE 14 within coverage of the access node 12. The access node and UE may be configured to communicate with each other over a radio frequency air interface 16 according to any of a variety of RATs, such as any of those noted above for instance. Without limitation, for instance, the RAT could be 4G LTE or 5G NR.

The access node could be a macro access node of the type configured to provide a wide range of coverage or could take other forms, such as a small cell access node, repeater, femtocell access node, or the like, possibly configured to provide a smaller range of coverage. In any case, the access node could have an antenna structure and associated components cooperatively configured to provide coverage and facilitate air-interface communication on at least one carrier according to a given RAT. The UE could then take any of the forms noted above, among other possibilities.

Further, the access node is shown coupled with an example core network 18, that may include components supporting an applicable RAT and providing connectivity with at least one transport network 20, such as the Internet. In a representative Evolved Packet System (EPS), the core network is an Evolved Packet Core (EPC) and includes a serving gateway (SGW) 20, a packet data network gateway (PGW) 22, a mobility management entity (MME) 24, a home subscriber server (HSS) 26, and a policy charging and rules function (PCRF) 28, among possibly other components.

With this arrangement, the SGW 20 and PGW 22 could cooperatively provide user-plane connectivity, to enable a UE served by the access node to engage in communication on the transport network. And the MME 24 could operate as a core-network controller to carry out operations such as coordinating UE attachment and setup and management of user-plane bearers. Further, the HSS 26 could store and provide account, service profile, and capabilities data for UEs such as UE 14. And the PCRF 28 could operate as a policy decision point to facilitate implementation of various network policies and other operations.

FIG. 1 also depicts, as a system accessible on or via the core network, an IMS platform (IMS) 28. The IMS operates to facilitate packet-based multimedia services, such as to support VoIP call service for instance. The IMS could include various proxy servers (e.g., call session control functions) and one or more media servers, cooperatively configured to support setup and hosting of VoIP calls for served UEs.

In line with the discussion above, when UE 14 initially enters into coverage of the example network, the UE could scan for and detect coverage of access node 12 and could then engage in random-access signaling and RRC-connection signaling to establish an RRC connection with the access node, which the access node could record in a context record for the UE.

Further, the UE could then engage in attach signaling with the MME, via the UE's RRC connection with the access node. And after authenticating the UE and considering the UE's service profile, the MME could then coordinate setup for the UE of one or more default bearers, such as a QCI 9 bearer for general Internet communications and a QCI 5 bearer for IMS signaling.

In the EPS, each such bearer could be an EPS bearer that extends from the UE to the PGW. In particular, each EPS bearer could include (i) an EPS radio bearer (E-RAB) portion that comprises a data-radio bearer (DRB) tunnel extending over the air between the UE and the access node and an S1-U bearer tunnel extending between the access node and the SGW and (ii) an S5 bearer portion that extends within the core network between the SGW and the PGW.

To configure each such bearer for the UE, the MME could initially engage in bearer-setup signaling with the access node and with the SGW to coordinate setup of the S1-U tunnel, providing the access node with a tunnel endpoint identifiers (TEID) of a port at the SGW, and providing the SGW with a TEID of an associated port at the access node, so that the access node and SGW could then exchange packet-data communications between their respective TEIDs. Further, the SGW could responsively engage in bearer-setup signaling with the PGW to similarly set up the S5 tunnel between TEIDs at the SGW and the PGW, and the access node could engage in RRC signaling with the UE to establish the DRB between the access node and the UE.

In addition, for each such bearer, the MME could also assign a respective EPS-bearer ID, and the UE, the access node, the SGW, and the PGW could record that EPS-bearer ID for reference, and the PGW or an associated server could assign a respective IP address for use by the UE to engage in packet-data communications that will flow over the bearer. Further, the MME could specify a QCI and perhaps one or more specific QoS parameters for the bearer, which the UE, access node, SGW, and PGW could likewise record directly or through mapping to associated DSCP values. Thus, the various entities along the bearer path would have a record of the set of QoS parameters for each such bearer, including knowledge that each default bearer is a non-GBR bearer and may have one more other specific QoS parameters.

Still further, as part of the setup process for each default bearer, the PGW or an associated server could assign a respective IP address for use by the UE to engage in associated packet-data communications that would flow over the bearer.

Once the UE is connected and attached, with one or more such bearers established, the access node could then serve the UE with packet-data communications.

For instance, when PGW receives packet-data for transmission to an IP address of the UE, the data could flow over a respective bearer to the access node, and the access node could buffer the data, pending transmission of the data over the air to the UE. With the example air-interface configuration noted above, the access node could then allocate downlink PRBs in an upcoming subframe for carrying a transport block of the data to the UE. And in that subframe, the access node could transmit to the UE a scheduling directive that indicates which PRBs will carry the data, and the access node could transmit the data to the UE in those PRBs.

Likewise, on the uplink, when the UE has packet-data for transmission on the transport network, the UE could buffer the data, pending transmission of the data over the air to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry a transport block of the data from the UE and could transmit to the UE a scheduling directive indicating those upcoming PRBs, and the UE could transmit the data to the access node in those PRBs.

For each such transmission on the downlink or the uplink, the receiving end (the UE or the access node) could determine if it received the transport block successfully and could engage in associated acknowledgement signaling with the transmitting end. For instance, the transmission could carry a cyclic redundancy check (CRC) value computed based on the transport block, and the receiving end could compute a CRC based on the received transport block and determine whether the computed CRC matches the CRC carried by the transmission. If the receiving end determines that the CRCs match, then the receiving end could send to the transmitting end a positive acknowledgement (ACK) message, and the transmitting end could then proceed with transmission of a next transport block (if any). Whereas, if the receiving end did not receive the transmission or determined that the CRCs did not match and thus that there was a block error, then the receiving end could send to the transmitting end a negative acknowledgement (NACK) message, in response to which the transmitting end could then attempt the transmission again.

As noted above, when the UE is connected with the access node, the network may also configure for the UE one or more dedicated bearers when appropriate to carry specific types of communications. For instance, the network could configure for the UE a dedicated GBR bearer with QCI 1, over which the UE could engage in a VoIP call.

In a representative implementation, for instance, to place an outgoing call or to receive an incoming call, the UE could engage in SIP signaling with the IMS via the UE's default IMS signaling bearer, negotiating to use a particular voice codec based on consideration of the UE's current wireless coverage quality and/or other factors. And this signaling could result in setup of a real-time packet-based media session (e.g., a Real-time Transport Protocol (RTP) session) between the UE and the IMS, with the IMS operating to bridge that session with a voice-call leg between the IMS and another call party.

Further, in relation to this call setup, the IMS could signal to the PCRF to trigger network-initiated setup for the UE of a dedicated GBR bearer with QCI 1, over which the UE's packetized voice communication with the IMS could then flow. For instance, PCRF could responsively direct the PGW to engage in bearer-setup for setting up a QCI 1 bearer for the UE, and the PGW could signal accordingly to the SGW, the SGW could signal accordingly to the MME, and the MME could coordinate setup of the QCI 1 bearer for the UE largely in the manner discussed above for the default bearers. Here, the PCRF and/or MME might specify one or more specific QoS parameters for the QCI 1 bearer (such as a particular minimum bit rate for the GBR bearer, among other possibilities), the MME may assign an EPS-bearer ID, and the entities in the bearer path may record an indication of the bearer including its EPS-bearer ID, its QCI, and perhaps one or more specific QoS parameters. Further, the UE could retain the IP address of its default IMS bearer for use to engage in VoIP communication over this QCI 1 bearer.

Once this QCI 1 bearer is set up for the UE and the UE has an established VoIP call session with the IMS, the VoIP call may then proceed. Namely, as the IMS has packetized voice data to transmit to the UE, the IMS could transmit that data to the PGW, the data could then flow from the PGW to the access node over the UE's QCI 1 bearer, and the access node could then schedule and provide transmission of the data over the associated DRB to the UE, with the UE providing associated acknowledgement messaging. And as the UE has packetized voice data to transmit to the IMS, the UE could transmit that data over the associated DRB to the access node, the data could then flow from the access node to the PGW over the UE's QCI 1 bearer, and the PGW could forward the data to the IMS.

While the UE is served by the access node, with or without being engage in a VoIP call or other such session, the UE may from time to time transmit measurement reports to the access node to inform the access node of quality of the UE's connection with the access node. For instance, the UE could periodically evaluate the reference signal broadcast by the access node and determine and report to the access node a reference signal receive strength (RSRP) and/or reference signal receive quality (RSRQ), and/or the UE may determine and report other such metrics, such as received signal strength indicator (RSSI), signal-to-interference-plus-noise ratio (SINR), C/I, Ec/Io, or the like, generally representing or relating to coverage strength from the access node. In addition or alternatively, the access node could provision the UE to provide such a measurement report by transmitting to the UE a measurement object that specifies a threshold condition such as threshold RSRP at which the UE should provide a measurement report.

Further in line with the discussion above, when the UE's coverage strength from the access node is especially weak, it could become impossible to satisfy one or more of the QoS requirements of the UE's QCI 1 bearer. For example, especially weak coverage may result in a high block error rate (BLER) as to voice communications on the QCI 1 bearer, which may result in associated retransmissions, which may lead to a low effective bit rate, high packet-loss rate, and high delay of voice transmissions, some or all of which may not satisfy the QoS requirements of the bearer. Although the UE might engage in further signaling with the IMS to adjust the voice-codec rate in an effort to improve the voice communications in the face of the poor RF coverage, that voice-codec adjustment may not be enough to overcome the issue.

In accordance with the present disclosure, as noted above, when the UE has a dedicated GBR bearer and the UE's wireless coverage becomes threshold weak, the network will engage in processing to loosen the set of QoS requirements of the bearer and will then invoke PDCP duplication to help offset the poor quality resulting from the weak coverage.

In an example implementation, the UE or access node could determine when the UE's coverage strength becomes at least as low as a predefined low threshold (e.g., for at least a threshold time period) while the UE has a dedicated GBR bearer, such as a QCI 1 bearer for instance. The low threshold could set to a value that is deemed by engineering design or machine learning to be so low that the UE is likely to experience unacceptably high BLER on the dedicated GBR bearer.

Upon determining that the UE's wireless coverage has been threshold weak while the UE has a dedicated GBR bearer, the UE and/or access node could then responsively signal to the MME to request loosening of one or more QoS requirements of the bearer, such as conversion of the bearer from being a dedicated GBR bearer (e.g., QCI 1) to being a dedicated non-GBR bearer (e.g., QCI 6). For instance, the UE could transmit to the access node a bearer-modification request specifying the EPS-bearer ID of the QCI 1 bearer and indicating the desired change of QoS of the bearer, and the access node could forward the request to the MME. Or the access node could itself generate and transmit to the MME such a request, likewise specifying the EPS-bearer ID of the QCI 1 bearer and indicating the desired change in QoS.

In response, the MME could then transmit to the SGW a corresponding bearer-resource command, which the SGW could forward to the PGW. This bearer-resource command could likewise specify EPS-bearer ID and the desired QoS change for the bearer, such as to convert the bearer from being a dedicated GBR bearer to being a dedicated non-GBR bearer for instance.

In response to this message, after consulting with the PCRF for instance, the PGW could then transmit an associated update-bearer request message to the SGW, which the SGW could forward to the MME. This update-bearer request message could specify one or more updated QoS parameters for the bearer, while retaining the bearer as a dedicated bearer (e.g., to avoid tearing down the bearer and reconfiguring a new bearer for the UE). For instance, the update-bearer request could specify that the bearer with that EPS-bearer ID will now be a QCI 6 bearer, namely a non-GBR bearer. And the update-bearer request message may further specify one or more associated QoS parameters for the dedicated non-GBR bearer, such as an aggregate maximum bit rate that the dedicated non-GBR bearer and its associated default QCI 5 bearer will have, among other possibilities.

Upon receipt of this update-bearer request message, the MME could then engage in signaling to coordinate application of the QoS change for the UE's VoIP bearer. For instance, the MME could signal to the access node and the SGW to update the associated QoS settings for the bearer's S1-U tunnel, the access node could accordingly signal to the UE to update the associated QoS settings for the bearer's DRB, and the SGW and PGW may engage in further signaling to update the associated QoS settings for the bearer's S5 tunnel.

As noted above, this loosening one or more QoS requirements of the UE's existing dedicated VoIP bearer may help to allow the QoS requirements of the bearer to be more easily met in the face of the UE's poor RF coverage, so as to help avoid having the UE's dedicated VoIP bearer be released and the UE's VoIP call be dropped. Further, so avoiding the release of the bearer may thereby facilitate carrying out the next step of the process, namely, application of PDCP duplication as to packet data being communicated on that bearer.

As indicated above, PDCP duplication involves the PDCP layer in a transmitting entity outputting multiple copies of a PDCP PDU for transmission to the receiving entity, and the PDCP layer of the receiving entity discarding all but one successfully received copy of the PDU if the receiving entity successfully receives at least one copy.

For most forms of communication between two devices, each device may implement a protocol stack that defines a sequence of logical processing layers, ranging from an application layer down to a physical layer (such as a physical cellular air-interface). In practice, the transmitting device could process the data in successive layers down the stack, ultimately outputting the result for transmission over the physical layer to the receiving device. And upon receipt of the data at the physical layer, the receiving device could then then process the data at successive layers up through the stack, reversing the per-layer processing carried out by the transmitting device so as to ultimately uncover the transmitted data. In this process, each segment of data that enters a given layer of the transmitting device's protocol stack for processing is referred to as a service data unit (SDU) of that layer, and each segment of data output from that protocol-stack layer is referred to as a PDU of that layer.

For communication of digitized voice data between a UE and a remote entity (perhaps the IMS or another call party), the transmitting entity could encode the digitized voice and could encapsulate successive segments of the encoded digitized voice data in RTP headers to establish RTP packets. Further, the transmitting entity could pass the RTP packets to a transport layer, where the transmitting entity could add a transport header (e.g., a user datagram protocol (UDP) header, and in turn to an Internet layer, where the transmitting entity could add an IP header thus producing an IP packet.

For transmission of each such IP packet over the air between the access node and the UE, the packet may then pass to a PDCP layer, where the transmitting entity may apply robust header compression (RoHC) that may replace the RTP, UDP, and IP headers with a much smaller RoHC header, and/or other processing to produce a PDCP PDU having a respective PDCP sequence number defining where the PDCP PDU falls sequentially. As the transmitting entity outputs each such PDCP PDU, the result may then pass through one or more link layers, such as a radio link protocol (RLP) (e.g., radio link control (RLC)) layer, where the transmitting entity may add an RLP header, and a Media Access Control (MAC) layer, where the transmitting entity may add a MAC header. And the transmitting entity may then modulate the end result on the physical air interface for transmission to the receiving entity.

Upon receipt of each such transmission from transmitting entity, the receiving entity may then reverse the processing of the MAC, RLP, and PDCP layers, to uncover the IP packets. For uplink transmission from the UE to the access node, the access node may then forward the IP packets to the SGW, which may forward the IP packets to the PGW, which may output the packets for transmission to the IMS. And for downlink transmission from the access node to the UE, the UE may then continue to process the IP packets up through the protocol stack to uncover the underlying voice data for playout to a user.

In an example implementation, once the QoS requirements of the UE's VoIP bearer have been loosened, such as when the bearer is converted from being a dedicated GBR bearer to being a dedicated non-GBR bearer, the access node could then invoke application of PDCP duplication on the downlink and/or the uplink with respect to that bearer. To facilitate this, the access node could transmit to the UE an RRC connection reconfiguration message or other message that informs the UE that PDCP duplication is to be applied, specifically with respect to the bearer at issue, identifying the bearer by its EPS-bearer ID for instance. The access node and UE could then proceed accordingly with application of PDCP duplication as to that bearer.

On the downlink, for example, for each of one or more sequence-numbered PDCP PDUs that the access node outputs from its PDCP layer for transmission on the bearer at issue, the access node could output multiple copies of that PDCP PDU all with the same sequence number as each other, and each copy could then be processed at one or more lower layers for ultimate transmission over the air from the access node to the UE. And as the UE uncovers through its protocol stack each such PDCP PDU that the UE receives, the UE could apply an integrity check process similar to the CRC process noted above to determine if the PDCP PDU arrived successfully. And of the multiple copies of each downlink PDCP PDU having the same sequence number as each other, the UE could discard all but one successfully received copy (if any), which the UE could then process up the remainder of the UE's protocol stack.

Likewise, on the uplink, for each for each of one or more sequence-numbered PDCP PDUs that the UE outputs from its PDCP layer for transmission on the bearer at issue, the UE could output multiple copies of that PDCP PDU all with the same sequence number as each other, and each copy could then be processed at one or more lower layers for ultimate transmission over the air from the UE to the access node. And as the access node uncovers through its protocol stack each such PDCP PDU that the access node receives, the access node could apply a similar integrity check process to determine if the PDCP PDU arrived successfully. And likewise, of the multiple copies of each uplink PDCP PDU having the same sequence number as each other, the access node could discard all but one successfully received copy (if any), which the access node could then process up the remainder of the access node's protocol stack to facilitate IP transmission through the core network.

The extent of PDCP duplication per PDCP PDU could be set dynamically based on consideration of various factors, such as (i) the extent of BLER recently experienced on the UE's air-interface connection, perhaps specifically as to communication on the bearer at issue, (ii) channel quality of the air-interface as reported by the UE, and/or (iii) mobility of the UE. For example, a greater number of duplicates of each PDCP PDU could be output for transmission over the air between the access node and the UE as the UE moves toward the cell edge and thus into weaker coverage of the access node.

Note also that, in addition to applying PDCP duplication in response to at least the UE being in threshold weak coverage of the access node, the UE and/or access node could also apply TTI-bundling. TTI bundling involves automatically repeat transmitting a given block of data in each of multiple transmission time intervals (TTIs), such as in each of multiple subframes. With PDCP duplication applied in combination with TTI bundling, PDCP PDUs would be duplicated, and MAC-layer transport blocks would be repeat transmitted in multiple TTIs, which could help further improve success of transmission.

Figure 2:
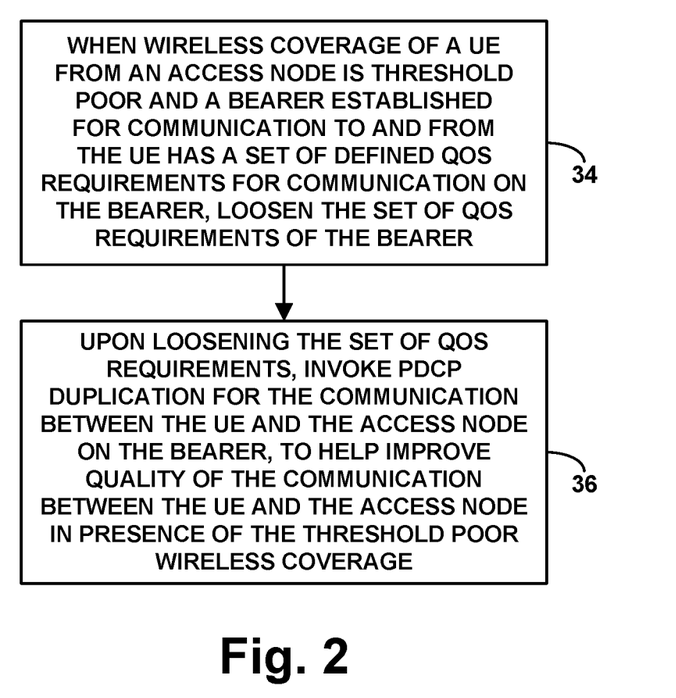
FIG. 2 is a flow chart depicting an example method per the disclosure.

FIG. 2 is a flow chart depicting a method that can be carried out in accordance with the present disclosure, to help facilitate communication between a UE and an access node that is serving the UE, in a scenario where a bearer is configured for the UE and has a defined set of quality-of-service (QoS) requirements for communication of user-plane data on the bearer and when wireless coverage of the UE from the access node is threshold poor.

As shown in FIG. 2, at block 30, the method includes loosening the set of QoS requirements of the bearer. And at block 32, the method includes, upon loosening the set of QoS requirements, the access node invoking PDCP duplication for the communication between the UE and the access node on the bearer, to help improve quality of the communication between the UE and the access node in presence of the threshold poor wireless coverage.

In line with the discussion above, the method could additionally include the act of determining that the wireless coverage of the UE from the access node is threshold poor, in which case the loosening and invoking could be carried out in response to the determining. Here, for instance, the act of determining that the wireless coverage of the UE from the access node is threshold poor could involve receiving from the UE a report indicating that strength of the wireless coverage is at least as low as a predefined threshold level.

As further discussed above, the acts of loosening and invoking could be triggered by signaling from the UE responsive to a determination by the UE that the wireless coverage of the UE from the access node is threshold poor. For instance, these two steps could be carried out once the UE has provided a bearer-modification request that seeks loosening of the set of QoS requirements of the bearer when the UE has determined that its wireless coverage from the access node is threshold poor.

Further, as discussed above, the acts of loosening and invoking could be responsive to a combination of (i) the wireless coverage of the UE from the access node being threshold poor and (ii) the bearer being a dedicated bearer for voice communication; for instance, those two items can be conditions precedent for, and a cooperative trigger for, the loosening and invoking.

As additionally discussed above, the set of QoS requirements of the bearer could include the bearer having a guaranteed minimum bit rate, in which case loosening the set of QoS requirements of the bearer could involve changing the bearer to no longer have a guaranteed minimum bit rate. Alternatively, regardless of whether the bearer is GBR or non-GBR, the loosening of the set of QoS requirements of the bearer could involve reducing at least one QoS requirement of the bearer to less stringent than the at least one QoS requirement was before the loosening.

Further, the bearer could be a dedicated bearer for voice communication and could have an associated bearer identifier, in which case wherein loosening the set of QoS requirements of the bearer could involve loosening the set of QoS requirements of the bearer while keeping the bearer as dedicated for voice communication and while maintaining the associated bearer identifier of the bearer.

Yet further, as discussed above, before the loosening of the set of QoS requirements of the bearer, the bearer could have a first QCI, in which case the act of loosening the set of QoS requirements of the bearer could involve changing the bearer from having the first QCI to instead having a second QCI associated with a less stringent set of QoS requirements than the first QCI. For instance, the first QCI might be QCI 1 among other possibilities, and the second QCI might a lower-QoS QCI such as QCI 6 among other possibilities.

Still further, as discussed above, the PDCP duplication could involve automatically outputting multiple instances of each of one or more sequence-numbered PDCP PDUs for transmission from the access node and the UE and/or from the UE to the access node. And the PDCP duplication could have an extent of duplication, such as a quantity of each sequence-numbered PDCP PDU being output, with the extent possibly determined based on (i) block error rate of communication between the UE and access node, (ii) reported channel quality of a wireless channel for communication between the UE and the access node, and/or (iii) mobility of the UE, such as the UE's speed or trajectory of movement for instance.

Yet further, as discussed above, the act of invoking the PDCP duplication could involve invoking the PDCP duplication for downlink communication from the access node to the UE and/or for uplink communication from the access node to the UE. And invoking the PDCP duplication could involve the access node signaling to the UE to coordinate setup of the PDCP duplication, such as to prepare the UE to duplicate the UE's output of PDCP PDUs and/or to prepare the UE to receive and handle duplicate downlink PDCP PDUs from the access node. And still further, the method could also involve applying TTI bundling in addition to the PDCP duplication.

Figure 3:
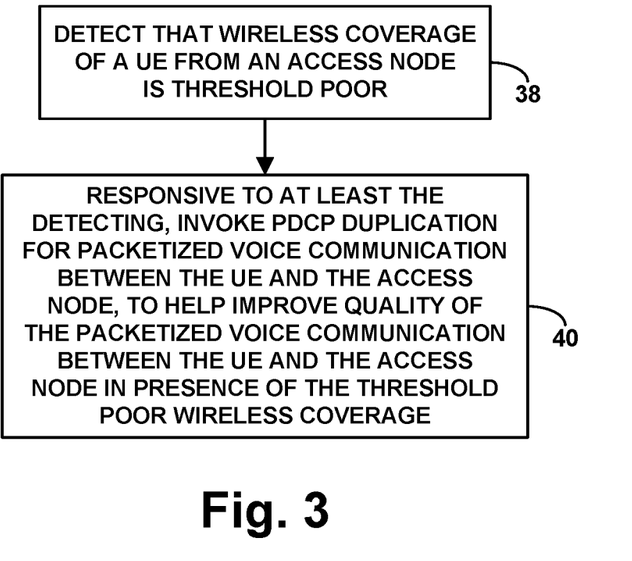
FIG. 3 is another flow chart depicting an example method per the present disclosure.

FIG. 3 is a flow chart depicting a method that can be carried out in accordance with the present disclosure, to help facilitate packetized voice communication between a UE and an access node that is serving the UE over an air-interface connection between the access node and the UE, in a scenario where a bearer is configured for the UE for carrying the packetized voice communication.

As shown in FIG. 3, at block 36, the method includes detecting that wireless coverage of the UE from the access node is threshold poor. And at block 38, the method includes, responsive to at least the detecting, invoking PDCP duplication for the packetized voice communication between the UE and the access node, to help improve quality of the packetized voice communication between the UE and the access node in presence of the threshold poor wireless coverage.

Various features discussed above can be implemented in this context as well, and vice versa.

For example, the bearer at issue could be a dedicated GBR bearer, in which case the method could additionally involve, before invoking the PDCP duplication, reconfiguring the bearer from being the dedicated GBR bearer to being a dedicated non-GBR bearer. Further, invoking the PDCP duplication could involve invoking the PDCP duplication for downlink communication from the access node to the UE and/or for uplink communication from the UE to the access node.

Figure 4:
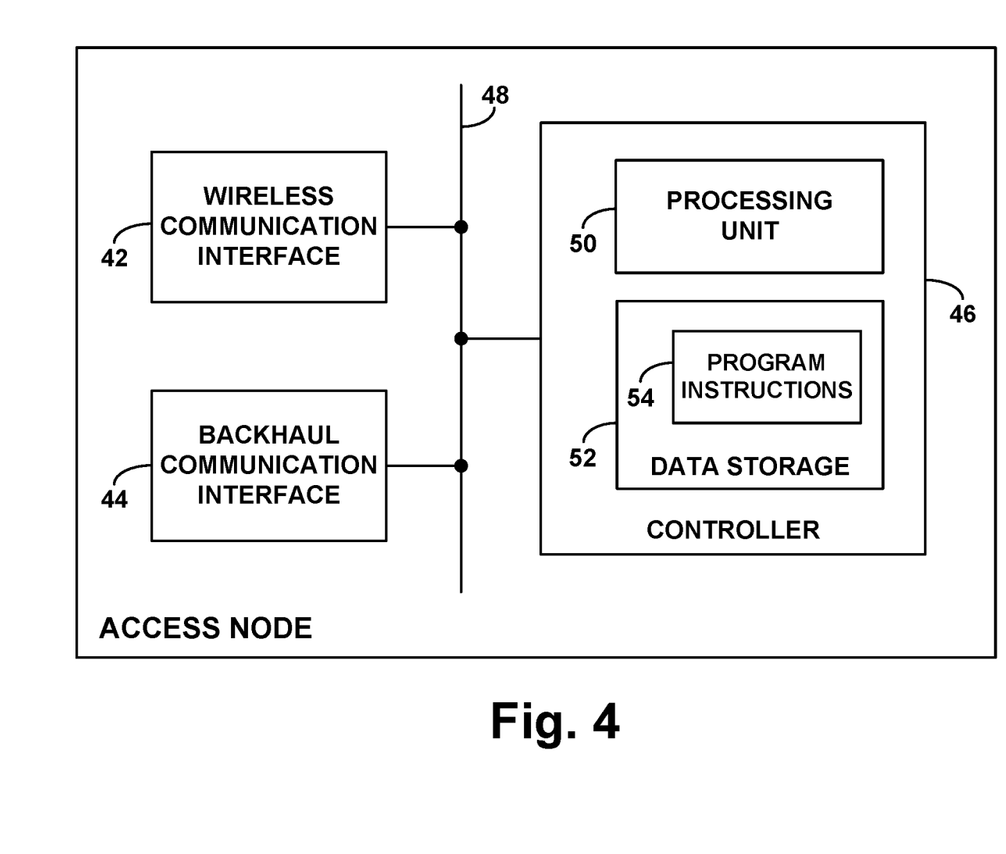
FIG. 4 is a simplified block diagram of an example access node operable in accordance with the disclosure.

FIG. 4 is a simplified block diagram of an example access node, showing some of the components that could be included to facilitate carrying out operations as described above. As shown in FIG. 4, the example access node includes a wireless communication interface 40, a backhaul communication interface 42, and a controller 44, which could be integrated together in whole or in part and/or could be communicatively linked together by a network, system bus, or other connection mechanism 46.

Wireless communication interface 40 could include various components (not shown) such as a radio, power amplifiers, filters, and an antenna structure through which the access node could engage in wireless communication with a UE.

Backhaul communication interface 42 could be a network communication interface (e.g., an Ethernet network interface port and/or connection) through which the access node could communicate on a core network.

And controller 44 could comprise a processing unit 48 (e.g., one or more general purpose microprocessors and/or one or more dedicated processors), non-transitory data storage (e.g., one or more volatile and/or non-volatile storage components) 50, and program instructions 52 stored in the data storage and executable by the processing unit to carry out (e.g., cause the access node to carry out) operations to help facilitate communication between the access node and the UE over the air interface when (i) the access node is serving the UE, (ii) a bearer is configured for the UE and has a defined set of QoS requirements for communication of user-plane data on the bearer and (iii) wireless coverage of the UE from the access node is threshold poor.

In line with the discussion above, the operations could include loosening the set of QoS requirements of the bearer, such as by engaging in signaling with a core-network controller and/or with the UE to modify the set of QoS requirements of the bearer so as to be less stringent and thus possibly more compatible with the UE's poor wireless coverage. Further, the operations could include, upon loosening the set of QoS requirements, invoking PDCP duplication for the communication between the access node and the UE to help improve quality of the communication between the access node and the UE in presence of the threshold poor wireless coverage.

Still further, as discussed above, the bearer could be a dedicated bearer for packetized voice communication. And as additionally discussed above, the act of loosening the set of QoS requirements of the bearer could involve reconfiguring the bearer from being a dedicated GBR bearer to instead being a dedicated non-GBR bearer.

Various features discussed above can be implemented in this context as well, and vice versa.

Figure 5:
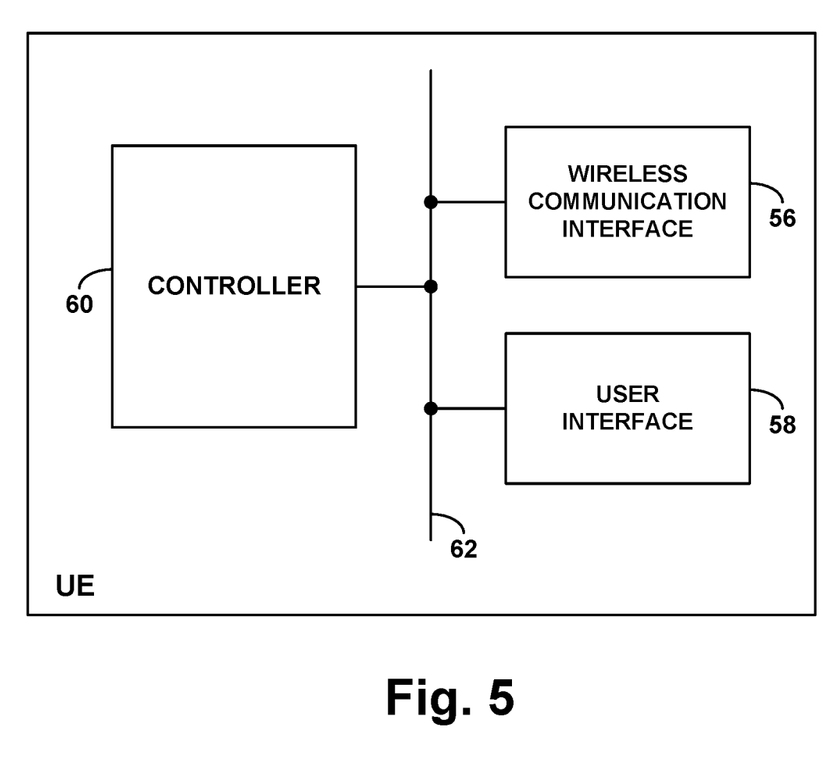
FIG. 5 is a simplified block diagram of an example UE operable in accordance with the disclosure.

FIG. 5 is next a simplified block diagram of an example UE, showing some of the components that could be included to facilitate carrying out operations as described above. As shown in FIG. 5, the example UE includes a wireless communication interface 54, a user interface 56, and a controller 58. These components could be interconnected, integrated in whole or in part, and/or could be communicatively linked together in various ways now known or later developed, such as by a system but or other connection mechanism 60 for instance.

Wireless communication interface 54 could include various components (not shown) such as a radio, power amplifiers, filters, and an antenna structure through which the UE could engage in wireless communication with an access node.

User interface 56, which could be included if the UE is user operated, could include input and output components (not shown) to facilitate interaction with a user. For instance, the user interface could include analog-to-digital conversion circuitry and could include input components such as a touch screen, microphone, and keypad, and output components such as a display screen and sound speaker, to facilitate voice communication among other functions.

And controller 58, which could likewise comprise components (not shown) such as a processing unit, non-transitory data storage, and program instructions stored in the data storage and executable the processing unit, could operate to carry out (e.g., cause the UE to carry out) various operations described herein. These operations could include reporting threshold poor wireless coverage, reducing one or more QoS requirements of a bearer in response to signaling from the access node or other core network entity, and engaging in PDCP duplication on the downlink and/or uplink in an effort to help improve communication between the UE and the access node when the UE has poor wireless coverage from the access node.

Here too, various features discussed above can be implemented in this context, and vice versa.

The present disclosure also contemplates at least one computer readable medium having stored thereon (e.g., encoded with) program instructions executable by a processing unit to carry out various operations described above.

Exemplary embodiments have been described above. Those skilled in the art will understand, however, that changes and modifications may be made to these embodiments without departing from the true scope and spirit of the invention.

What is claimed is:

1. A method to help facilitate communication between a user equipment device (UE) and an access node that is serving the UE, wherein a bearer is configured for the UE, the bearer having a defined set of quality-of-service (QoS)

requirements for communication of user-plane data on the bearer, the method comprising:
  when wireless coverage of the UE from the access node is threshold poor, (i) loosening the set of QoS requirements of the bearer and (ii) invoking by the access node Packet Data Convergence Protocol (PDCP) duplication for the communication between the UE and the access node on the bearer.

2. The method of claim 1, further comprising determining that the wireless coverage of the UE from the access node is threshold poor, wherein the loosening and invoking are responsive to the determining.

3. The method of claim 2, wherein determining that the wireless coverage of the UE from the access node is threshold poor comprises receiving from the UE a report indicating that strength of the wireless coverage is at least as low as a predefined threshold level.

4. The method of claim 1, wherein the loosening and invoking are triggered by signaling from the UE responsive to a determination by the UE that the wireless coverage of the UE from the access node is threshold poor.

5. The method of claim 1, wherein the loosening and invoking are responsive to a combination of (i) the wireless coverage of the UE from the access node being threshold poor and (ii) the bearer being a dedicated bearer for voice communication.

6. The method of claim 1, wherein the set of QoS requirements of the bearer includes the bearer having a guaranteed minimum bit rate, and wherein loosening the set of QoS requirements of the bearer comprises changing the bearer to no longer have a guaranteed minimum bit rate.

7. The method of claim 6, wherein the bearer is a dedicated bearer for voice communication and has an associated bearer identifier, and wherein loosening the set of QoS requirements of the bearer comprises loosening the set of QoS requirements of the bearer while keeping the bearer dedicated for voice communication and maintaining the associated bearer identifier of the bearer.

8. The method of claim 1,
  wherein, before loosening the set of QoS requirements of the bearer, the bearer has a first QoS class identifier (QCI), and
  wherein loosening the set of QoS requirements of the bearer comprises changing the bearer from having the first QCI to instead having a second QCI associated with a less stringent set of QoS requirements than the first QCI.

9. The method of claim 1, wherein the PDCP duplication comprises automatically outputting multiple instances of each of one or more sequence-numbered PDCP protocol data units (PDUs) for transmission from one of the access node and the UE to the other of the access node and the UE.

10. The method of claim 9, wherein the PDCP duplication has an extent of duplication determined based on at least one factor selected from the group consisting of (i) block error rate of communication between the UE and access node, (ii) reported channel quality of a wireless channel for communication between the UE and the access node, and (iii) mobility of the UE.

11. The method of claim 1, wherein invoking the PDCP duplication comprises invoking the PDCP duplication for at least one of downlink communication from the access node to the UE and uplink communication from the access node to the UE, and wherein invoking the PDCP duplication comprises the access node signaling to the UE to coordinate setup of the PDCP duplication.

12. The method of claim 1, further comprising applying transmission time interval (TTI) bundling in addition to the PDCP duplication.

13. A method to help facilitate packetized voice communication between a user equipment device (UE) and an access node that is serving the UE over an air-interface connection between the access node and the UE, wherein a bearer is configured for carrying the packetized voice communication, wherein the bearer is a dedicated guaranteed-bit-rate (GBR) bearer, the method comprising:
  detecting that wireless coverage of the UE from the access node is threshold poor, and
  responsive to at least the detecting, (i) reconfiguring the bearer from being the dedicated GBR bearer to being a dedicated non-GBR bearer and (ii) invoking Packet Data Convergence Protocol (PDCP) duplication for the packetized voice communication between the UE and the access node.

14. The method of claim 13, wherein invoking the PDCP duplication comprises invoking the PDCP duplication for downlink communication from the access node to the UE.

15. The method of claim 13, wherein the PDCP duplication comprises automatically outputting multiple instances of each of one or more sequence-numbered PDCP protocol data units (PDUs) for transmission from one of the access node and the UE to the other of the access node and the UE.

16. The method of claim 15, wherein the PDCP duplication has an extent of duplication determined based on at least one factor selected from the group consisting of (i) block error rate of communication between the UE and access node, (ii) reported channel quality of a wireless channel for communication between the UE and the access node, and (iii) mobility of the UE.

17. An access node comprising:
  a wireless communication interface including an antenna structure through which to engage wireless communication with a user equipment device (UE) served by the access node;
  a backhaul communication interface through which to communicate on a core network;
  a controller configured to carry out operations to help facilitate communication between the access node and the UE over an air interface when (i) the access node is serving the UE, (ii) a bearer is configured for the UE and has a defined set of quality-of-service (QoS) requirements for communication of user-plane data on the bearer and (iii) wireless coverage of the UE from the access node is threshold poor,
  wherein the operations include loosening the set of QoS requirements of the bearer and invoking Packet Data Convergence Protocol (PDCP) duplication for the communication between the access node and the UE.

18. The access node of claim 17, wherein the bearer is a dedicated bearer for voice packetized communication.

19. The access node of claim 17, wherein loosening the set of QoS requirements of the bearer comprises reconfiguring the bearer from being a dedicated guaranteed-bit-rate (GBR) bearer to instead being a dedicated non-GBR bearer.

* * * * *